C. HARRIS.
POULTRY FEEDER AND EXERCISER.
APPLICATION FILED MAR. 19, 1918. RENEWED FEB. 15, 1919.

1,299,719.

Patented Apr. 8, 1919.

INVENTOR
Christopher Harris.

WITNESSES

BY

ATTORNEY

UNITED STATES PATENT OFFICE.

CHRISTOPHER HARRIS, OF CEYLON, MINNESOTA, ASSIGNOR TO CEYLON HARDWARE AND FURNITURE COMPANY, OF CEYLON, MINNESOTA.

POULTRY FEEDER AND EXERCISER.

1,299,719. Specification of Letters Patent. Patented Apr. 8, 1919.

Application filed March 19, 1918, Serial No. 223,359. Renewed February 15, 1919. Serial No. 277,358.

*To all whom it may concern:*

Be it known that I, CHRISTOPHER HARRIS, a citizen of the United States, residing at Ceylon, in the county of Martin and State of Minnesota, have invented certain new and useful Improvements in Poultry Feeders and Exercisers, of which the following is a specification.

This invention relates to animal husbandry, and more especially to feeding devices wherein a hopper has an animal controlled supply; and the object of the same is to give the hen exercise along with her food.

The invention furthermore aims to simplify the structure of devices of this character, while increasing their utility. Details will be found below, and reference is made to the drawings, wherein:—

Figures 1, 2:
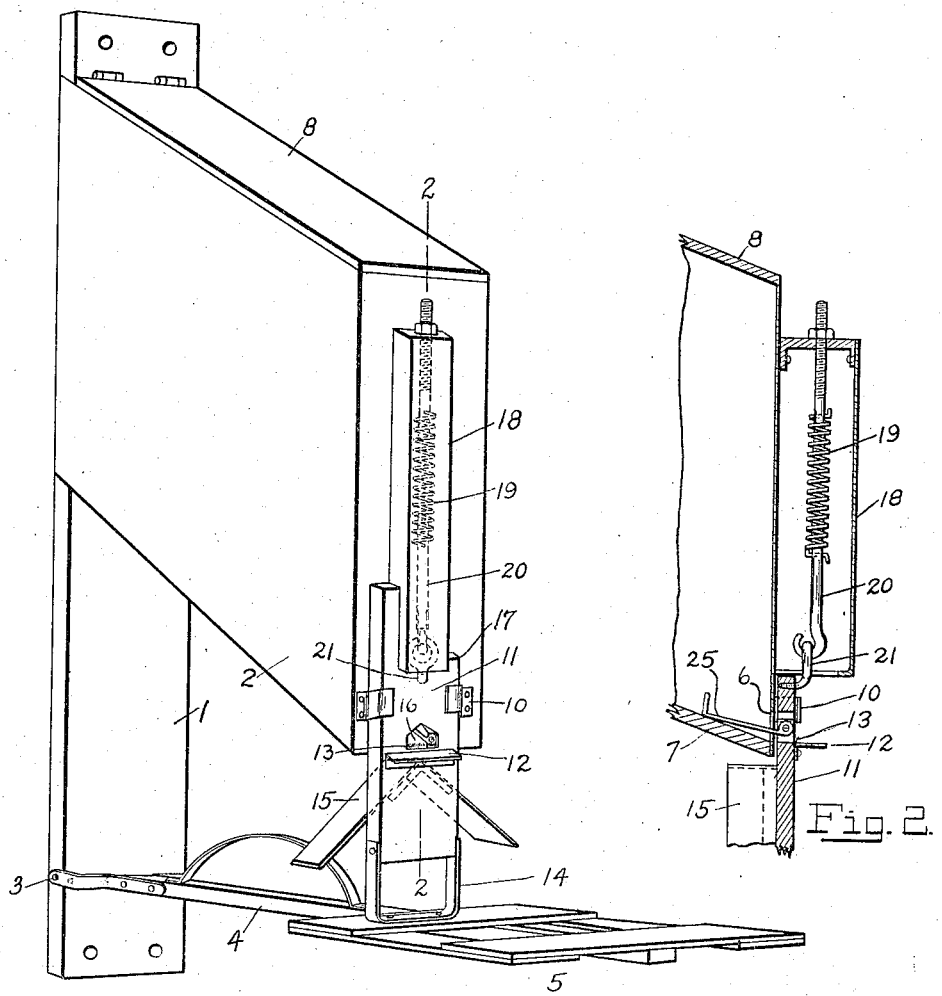
Figure 1 is a perspective view of the device complete.
Fig. 2 is a sectional detail.

To an upright 1 is attached a hopper 2 having a sloping bottom, and to the upright below the hopper is hinged at 3 a lever 4 carrying a platform 5 which extends some distance forward of the hopper and is intended to stand about eighteen inches above the ground when the upright is properly mounted as by being nailed against the hen house wall. The lever is shown in Fig. 1 as carrying an upstanding loop to prevent the fowls from resting on this lever, because it is preferred that they will fly onto the platform as described below. An outlet opening 6 is formed in the outer wall of the hopper 2 near its bottom. The top of the hopper indicated at 8 will doubtless be hinged so that it may be raised to replenish the supply. The size of the parts will be proportionate to the flock of fowls or poultry to be fed.

In guides 10 on the front of the hopper is mounted for vertical reciprocation what I call a feed slide 11, the same preferably having an opening 16 adapted to register with the outlet opening 6 in the front wall of the hopper, a feed shelf 12 carried by its front face just beneath said opening, a brush or a row of bristles 13 along the bottom of the opening, a spreader 15 at an appropriate point for a purpose yet to appear, and a connection 14 extending downward and attached to the platform 5. The top of this slide is preferably shaped as shown at 17 to underlie a casing 18 carried by the front wall of the hopper, and within said casing is disposed a strong contractile spring 19, surrounding a hook 20. In the upper end 17 of the slide 11 is an eye 21 which rises into said casing and engages the hook, and therefore the normal contraction of this spring raises the hook and the eye and elevates the slide. Some appropriate form of food-agitator 25 may well be pivoted in the opening 16 and project through the opening 6 and into the hopper 2, and the presence of this agitator will prevent said openings from getting entirely out of register, whereas it will not prevent them from coming into exact register. Such exact register preferably occurs when the parts stand as seen in the drawings with the slide raised as far as its upper end 17 will permit, and at this time the food within the hopper in rear of the brush or bristles 13 is in clear view of a fowl standing on the platform 5, and some of it has run out onto the feed shelf 12 to serve as a lure. But as soon as the fowl flies up on the platform, her weight overcomes the spring and the slide moves downward. The food within the opening 16 behind the bristles now moves downward and falls to the rear onto the spreader 15, by which it is diverted from the platform and drops onto the ground. Other fowls stop to pick it up and that induces the one in question to jump down onto the ground to help them. Soon she or some other hen repeats this operation, with the result that the poultry is given ample exercise in securing a meal, and yet the distribution of the feed is automatic and slow rather than so rapid that the hens are apt to gorge themselves. The parts of this device are extremely simple and are not likely to get out of order, inexpensive and readily cleaned or repaired.

What is claimed is:—

1. In a poultry feeder, the combination with a hopper having an inclined bottom and an outlet opening in its front wall near said bottom; of guides on said wall, a slide movably mounted therein and having an opening adapted to register with that mentioned, means for raising said slide with yielding force until said openings register, a feed shelf in front of the opening in the slide, and a platform carried by said slide on which an approaching fowl may light.

2. In a poultry feeder, the combination with a hopper having an inclined bottom and an outlet opening in its front wall near said bottom; of guides on said wall, a slide movably mounted therein and having an opening adapted to register with that mentioned, means for raising said slide with yielding force, a platform carried thereby on which an approaching fowl may light, a feed shelf on the front of the slide beneath said opening, and a spreader on the rear of the slide also beneath this opening.

3. In an animal actuated feeding apparatus, the combination with a hopper having an outlet opening at a low point, and guides on its front wall; of a slide movable under said guides and having an opening through its body adapted to register with that mentioned, yielding means for normally raising the slide to maintain registry of the openings, and a brush across the lower side of the opening in the slide, for the purpose set forth.

4. In an animal actuated feeding apparatus, the combination with a hopper having an outlet opening at a low point, and guides on its front wall; of a slide movable under said guides and having an opening through its body adapted to register with that mentioned, yielding means for normally raising the slide to maintain registry of the openings, means across the opening in the slide for retarding the flow of feed therethrough, and an agitator pivoted in said opening and projecting through the opening in the wall into the hopper.

5. In an animal actuated feeding apparatus, the combination with a hopper having an outlet opening at a low point, and guides on its front wall; of a slide movable under said guides and having an opening through its body adapted to register with that mentioned, yielding means for normally raising the slide to maintain registry of the openings, upstanding bristles secured across the lower side of the opening in the slide, and a feed shelf secured to its front face beneath the opening.

6. In a poultry feeder and exerciser, the combination with a hopper having an outlet opening, a feed slide moving across said opening and itself having an opening adapted to register therewith, and yielding means holding the openings normally in register; of means for retarding the flow of feed through the openings at this time, an agitator carried by the slide and projecting into the hopper, a spreader on the slide, and a platform connected with the slide, for the purpose set forth.

In testimony whereof I affix my signature in presence of two witnesses.

CHRISTOPHER HARRIS.

Witnesses:
R. P. SIMLAIN,
ADELA F. PETERS.

Copies of this patent may be obtained for five cents each, by addressing the "Commissioner of Patents, Washington, D. C."